US012789570B2

(12) United States Patent
Kondor et al.

(10) Patent No.: US 12,789,570 B2
(45) Date of Patent: Nov. 10, 2026

(54) BEARING

(71) Applicant: SUMITOMO RIKO COMPANY LIMITED, Aichi (JP)

(72) Inventors: Jozsef Kondor, Künzell (DE); Benedikt Kraus, Motten (DE); Nallasamy Ramasamy, Steinau an der Straße (DE)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 2 days.

(21) Appl. No.: 18/588,825

(22) Filed: Feb. 27, 2024

(65) Prior Publication Data

US 2024/0326538 A1 Oct. 3, 2024

(30) Foreign Application Priority Data

Mar. 28, 2023 (DE) ..................... 10 2023 107 866.6

(51) Int. Cl.
*B60G 11/52* (2006.01)
*B60G 15/04* (2006.01)
*B60G 15/06* (2006.01)
*F16C 33/20* (2006.01)
*F16C 33/22* (2006.01)

(52) U.S. Cl.
CPC .............. *B60G 15/04* (2013.01); *B60G 11/52* (2013.01)

(58) Field of Classification Search
CPC .... B60G 11/52; B60G 13/005; B60G 13/006; B60G 15/02; B60G 15/04; B60G 15/067; B60G 2204/12; B60G 2204/128; B60G 2204/129; B60G 2204/13; B60G 2204/41; B60G 2204/4102; B60G 2204/4103; B60G 2204/4104; F16C 33/02; F16C 33/04; F16C 33/20; F16C 33/201; F16C 33/22
USPC .................................................. 280/124.155
See application file for complete search history.

(56) References Cited

U.S. PATENT DOCUMENTS

2001/0026057 A1 10/2001 Hayash et al.
2003/0091249 A1* 5/2003 Kurimura ............ F16C 33/745 384/100
2013/0009376 A1* 1/2013 Kaneko .................. F16C 33/20 384/216

FOREIGN PATENT DOCUMENTS

| | | | | | |
|---|---|---|---|---|---|
| CN | 110594287 A | * | 12/2019 | .............. F16C 17/02 |
| CN | 113286714 A | * | 8/2021 | ............ F16F 1/3814 |
| DE | 3716441 C1 | * | 4/1988 | .............. F16F 15/10 |
| DE | 102009029302 B3 | | 3/2011 | |
| DE | 102012200001 A1 | * | 7/2013 | ............. B60G 7/005 |
| DE | 112019002027 T5 | * | 1/2021 | ............... F16D 3/41 |

(Continued)

OTHER PUBLICATIONS

Office action issued by the German Patent Office for application DE 10 2023 107 866.6 on Jan. 16, 2025.

(Continued)

*Primary Examiner* — Daniel M. Keck
(74) *Attorney, Agent, or Firm* — REISING ETHINGTON, P.C.

(57) ABSTRACT

The disclosure relates to a bearing for a device to be mounted, in particular a support bearing and/or a spring strut head bearing. The bearing comprises a base body. The bearing further comprises a disk which is surrounded by the base body, wherein the disk serves to attach the bearing to the device to be mounted. The bearing further comprises a radial spring arrangement which adjoins a bearing environment via a contact surface.

8 Claims, 3 Drawing Sheets

(56) References Cited

FOREIGN PATENT DOCUMENTS

| | | | | | |
|---|---|---|---|---|---|
| EP | 352445 A1 | | 8/2019 | | |
| JP | 2002274137 A | | 9/2002 | | |
| JP | 2008202609 A | * | 9/2008 | .............. | F16F 7/108 |
| JP | 2012057749 A | * | 3/2012 | | |
| JP | 2016136030 A | * | 7/2016 | | |
| KR | 20210055419 A | * | 5/2021 | ........... | B60G 15/068 |
| WO | WO-2019177432 A1 | * | 9/2019 | ............. | B29C 45/14 |

OTHER PUBLICATIONS

English Translation of the Office action issued by the German Patent Office for application DE 10 2023 107 866.6 on Jan. 16, 2025.
Examination Report issued by the German Patent Office for application DE 10 2023 107 866.6 on Oct. 17, 2023.
English Translation of the Examination Report issued by the German Patent Office for application DE 10 2023 107 866.6 on Oct. 17, 2023.
Office action issued by the German Patent Office for application DE 10 2023 107 866.6 on Jun. 9, 2026.

* cited by examiner

BEARING

CROSS-REFERENCE TO RELATED APPLICATIONS

This application claims the priority of German patent application DE 10 2023 107 866.6, filed Mar. 28, 2023, the entire content of which is hereby incorporated by reference.

FIELD

The present invention relates to a bearing for a device to be mounted, in particular a support bearing and/or a spring strut head bearing, comprising a base body which extends along and around a central axis and comprising a disk for arranging the bearing on the device to be mounted, such as is mentioned in the preamble of patent claim 1.

BACKGROUND

There are various bearing devices in the prior art, for example rubber bearings or the like, which serve to mount for example a spring strut head, wherein prior-art rubber bearings either use an outer tube or a housing or flange, or the geometry of the radial spring arrangement of the rubber bearing is extremely massive where an outer tube or flange is not used. In the prior art, this then results in high loads during operation which have an effect on the radial springs. Greater wear, damage and consequently a shorter service life as well as increased noise emission are the consequences of the design of prior-art bearings or rubber bearings.

EP 3 892 480 A1, for example, discloses a bearing in which the rubber bearing is incorporated into a flange or housing, wherein high shear stresses and high friction forces have to be absorbed by the base body of the rubber bearing when it is subjected to loads. A radially outer portion of the rubber body of this prior-art embodiment is fixedly press-fitted into the flange, and the majority of the loads during operation has to be absorbed in the axial direction by beveled abutting surfaces and the accumulations of material between them. This results in a shortened service life for the bearing. This design also results in noise when the rubber body is subjected to and relieved of a load. Vibrations are also inadequately damped due to the comparatively fixed or inflexible mounting of the rubber body in the flange.

SUMMARY

An object of the present embodiments is to provide a bearing which provides a longer service life for at least the same functionality and which minimizes noise emission.

A bearing for a device to be mounted, to a support bearing, or a spring strut head bearing, or both, which can be used in vehicles is provided. The bearing comprises a base body which extends along and around a central axis. The bearing further comprises a disk, for attaching the bearing to the device to be mounted, which extends around and substantially perpendicular to the central axis. The bearing further comprises a radial spring arrangement which is provided on the outer circumference of the base body. The radial spring arrangement comprises a stay which extends outwards from the base body at an angle up to perpendicular to the central axis. On the side of the stay facing away from the base body, the radial spring arrangement comprises a contact body which has a radially outwardly facing contact surface.

The contact surface of the bearing is press-fitted into a housing, tube or flange in the functional position, and when it is subjected to loads, the contact body can perform a rolling movement relative to the housing, tube or flange by means of the stay and/or by means of the contact bodies. The contact surface remains stationary on the inner diameter of the housing, tube or flange, while the contact body and the stay are deformed in order to enable the rolling movement. If the constituent parts of the bearing in accordance with an embodiment are not subjected to a load, they return to their original position.

This rolling movement of the radial spring(s) substantially improves the service life of the bearing of the embodiments as compared to prior-art bearings.

The operating noise or disruptive noise of the bearing is also reduced, since the rolling movement of the radial spring arrangement proceeds reversibly and continuously and therefore few relative movements occur between the radial spring arrangement and the flange or housing.

Cross-sectionally, the stay and the contact body can for example have the shape of a mushroom head, mushroom, hammer or the like, or the housing, tube or flange can be embodied to comprise a groove or other inner contour which the contact surface of the contact body engages in order to remain stationary with the assistance of the positive fit, while the bearing as a whole performs a rolling movement over the stay along with the contact body.

Sufficient friction can be established between the contact surface and the inner wall of the tube or the inner wall of the flange or housing, such that the rolling movement is performed within the bearing, while the contact surface remains stationary on the inner wall of the tube or the inner wall of the flange or housing.

A flange as set forth below, also encompasses a housing and a tube.

The bearing, which is for example manufactured from rubber, natural rubber, softer plastic materials or the like, is press-fitted into a flange with sufficient force that sufficient or more than sufficient friction can be created between the contact surface of the contact body and the wall of the flange. If large oscillations are axially required, the inner wall of the flange can also be embodied to comprise a geometry, for example a groove, which also provides a positive fit in addition to the friction, so that the rolling movement of the bearing in accordance with the invention does not result in the contact surface of the contact body oscillating out of its predetermined position.

In order to describe the friction force which should ensure that the contact surface remains at a predetermined, desired position on the inner wall of a tube or the flange, the following formula is expressed:

$$Fr = \mu \times Fn$$

where Fr denotes the friction between the radial spring arrangement and therefore the contact surface of the contact body and the inner wall of the flange into which the bearing in accordance with the invention is press-fitted. The region of the contact surface can be denoted as K.

The friction force Fr should be set as high as possible, which means that the coefficient of friction μ is likewise set as high as possible, which can be achieved by expedient materials or a surface quality and/or surface structure of the surfaces to be taken into consideration. Fn is the normal force which should likewise be set as high as possible, wherein a bias V which is set by press-fitting the bearing in accordance with the invention into the flange should likewise be as high as possible. This variable V can also be increased by a suitably adjusted Shore A hardness. The bias V should still be as high as possible even after the maximum oscillation, i.e., the maximum rolling movement in the direction of the central axis of the bearing.

The contact surface K on the outer circumference of the contact body should be as large as possible in order to be able to ensure that the bearing is stationary despite the rolling movement, even without any additional force-fit structures on the flange. The neck or stay H should be as flexible as possible and can be soft due to a material constriction or material selection. The length of the stay or the length L of the radial spring arrangement in the radially outward direction should be as large as possible in order to likewise assist flexibility.

While the stay can be embodied such that it extends radially outwards perpendicular to the central axis of the bearing, it can however also advantageously extend at an angle. The stay can then extend upwards or downwards at an angle, starting from the perpendicular onto the central axis of the bearing, wherein the contact body and/or contact surface should preferably also then be adapted to this variant of the stay.

The thickness S of the disk accommodated in the bearing is variable and depends on the device which is to be attached and mounted. The disk can also be contoured or coated in plastic. The disk is preferably substantially symmetrical, but can also be asymmetrical. Grooves and/or ridges or the like can likewise be expedient for assembly purposes, wherein they should preferably be formed on inner and/or outer edge regions.

In relation to the variable ratios, the following should be noted in advance: $K>H$; $L>H$; $V<L$ and $V>0$; $H>S$ but not very much greater than S.

It should also be noted that the bias V should be at a predetermined ratio with respect to the overall length L of the radial spring arrangement, i.e. the stay and the contact body, radially outwards up to the end of the non-press-fitted radial spring arrangement, i.e. $V/L \leq 0.75$ would be preferable, wherein the rolling movement and therefore the oscillation in the direction of the central axis should be equal to or less than V.

A broadly achievable oscillation Z in the direction of the central axis can (by way of non-limiting example, but may preferably) be ascertained using the formula $Z \sim \sqrt{L^2-(L-V)^2}$.

An embodiment can result if the radial spring arrangement is provided over some or all of the circumference of the base body, as required.

It can also be advantageous for the radial spring arrangement to be formed at preferably equal intervals on the outer circumference of the base body.

The contact body can advantageously be larger than the stay in the direction of the central axis.

In accordance with another embodiment, the disk can preferably be provided centrally in the base body in the direction of the central axis. Cross-sectionally, the base body can extend symmetrically around the disk. An undulating geometry of the base body can also result in resilient properties. The undulations, for example at the edge regions in the direction of the central axis, can also be replaced with a uniformly extending lip on one or both sides of the base body.

The geometric orientation of the disk within the bearing can preferably be such that the stay and/or the contact body extend radially outwards as a continuation of the disk, starting from the base body.

The bearing is preferably used in combination with a flange having a respective inner wall which the contact surface of the contact body abuts. The bearing in accordance with the invention can of course also be press-fitted into a predetermined hollow space, for example the body of a vehicle.

BRIEF DESCRIPTION OF THE DRAWINGS

The present invention is explained in more detail below on the basis of an embodiment and by referring to the attached figures, wherein the figures show.

DETAILED DESCRIPTION

Figure 1:
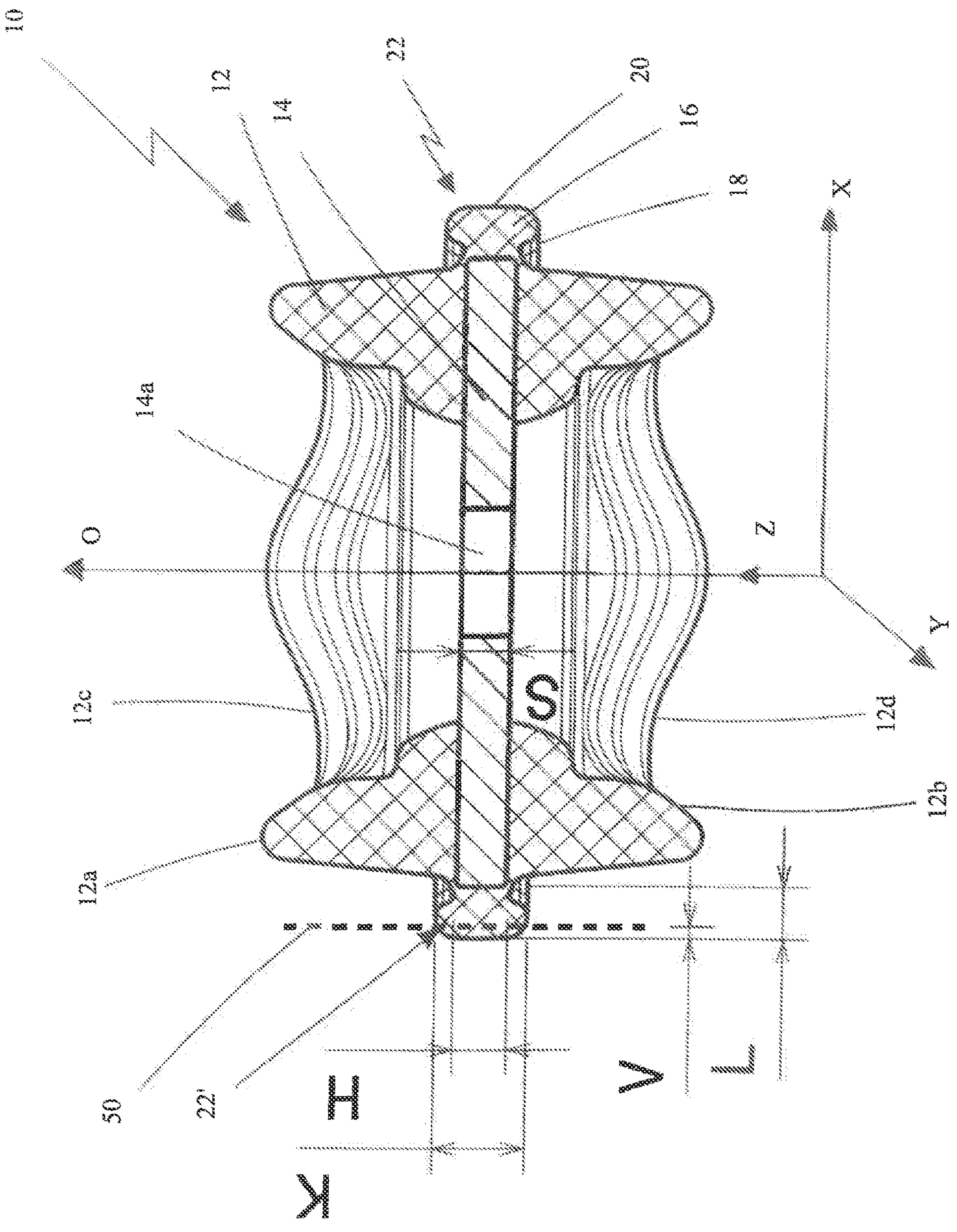
FIG. 1 is a schematic longitudinal section perpendicular to the central axis of the bearing in accordance with the invention.

In FIG. 1, a preferred embodiment is indicated generally by the reference sign 10.

The bearing 10 comprises a base body 12 which can generally be manufactured from silicone, natural rubber or also TPE, TPU or a soft plastic or combinations of these materials.

The base body 12 can be radially symmetrical, though this does not necessarily have to be the case. In relation to an XYZ coordinate system, the central axis O extends parallel to the Z axis and the base body extends in the radial direction in the XY plane.

A disk 14 which is incorporated into the base body 12 of the bearing 10 in accordance with an embodiment of the invention according to FIG. 1 serves to fix a device, which is to be mounted, to the bearing 10. In this respect, reference may be made to FIG. 1 in the document EP 3 892 480 A1 referenced in the introductory portion of the description, which can reflect an assembly position of a prior-art bearing or also a bearing in accordance with the embodiments described herein.

The bearing 10 comprises successive wave crests 12*a*, 12*b* and wave troughs 12*c*, 12*d* which adjoin each other to form a body which is deformable in the direction Z of the central axis O and also radially, i.e. when the device to be mounted exerts a force on the bearing 10 in accordance with the invention, the wave crests 12*a*, 12*b* can be deformed in relation to the wave troughs 12*c*, 12*d* in order to perform their function as a bearing in the vertical direction.

The disk 14 comprises an assembly opening 14*a* via which a device to be mounted can be assembled.

In accordance with the embodiments, the bearing 10 comprises a contact body 16 which is placed onto the base body 12 of the bearing 10 via a stay 18. Preferably, all of the constituent parts of the bearing 10 in accordance with the invention are formed in one piece or integrally, for example by injection molding or the like. The contact body 16 of the radial spring arrangement 22 comprises a contact surface 20 via which the bearing 10 adjoins an installation environment in its installed position. This installation environment, which is shown schematically by the reference sign 50, can for example be formed from a tube which surrounds the bearing 10 or from a flange, housing or the like.

FIG. 1 likewise shows how the installation environment can deform the contact body 16 of the radial spring arrangement, as is intended to be shown by the reference sign 22'. The dashed line of the installation environment 50, for example a flange 50, shows the profile of the contact surface 20 when the bearing 10 is press-fitted.

In order to describe the friction force which should ensure that the contact surface 20 remains at a predetermined, desired position on the inner wall of a tube or the flange 50, the following formula is expressed:

$$Fr=\mu\times Fn$$

where Fr denotes the friction between the radial spring arrangement 22 and therefore the contact surface 20 of the contact body 16 and the inner wall of the flange 50 into which the bearing 10 in accordance with the invention is press-fitted. The region of the contact surface 20 can be denoted as K.

The friction force Fr should be set as high as possible, which means that the coefficient of friction is likewise set as high as possible, which can be achieved by expedient materials or a surface quality and/or surface structure of the surfaces to be taken into consideration. Fn is the normal force which should likewise be set as high as possible, wherein a bias V which is set by press-fitting the bearing 10 in accordance with the invention into the flange 50 should likewise be as high as possible. This variable V can also be increased by a suitably adjusted Shore A hardness. The bias V should still be as high as possible even after the maximum oscillation, i.e., the maximum rolling movement in the direction of the central axis O of the bearing 10.

The contact surface K on the outer circumference of the contact body 16 should be as large as possible in order to be able to ensure that the bearing 10 is stationary despite the rolling movement, even without any additional force-fit structures on the flange 50. The neck or stay H should be as flexible as possible and can be soft due to a material constriction or material selection. The length of the stay H or the length L of the radial spring arrangement 22 in the radially outward direction should be as large as possible in order to likewise support flexibility.

While the stay H can be embodied such that it extends radially outwards perpendicular to the central axis O of the bearing 10, it can however also advantageously extend at an angle. The stay H can then extend upwards or downwards at an angle, starting from the perpendicular onto the central axis O of the bearing 10, wherein the contact body 16 and/or contact surface K should preferably also then be adapted to this variant of the stay H.

The thickness S of the disk 14 accommodated in the bearing 10 is variable and depends on the device which is to be attached and mounted.

In relation to the variable ratios, the following should be noted in advance: K>H; L>H; V<L and V>0; H>S but not very much greater than S.

It should also be noted that the bias V should be at a predetermined ratio with respect to the overall length L of the radial spring arrangement 22, i.e. the stay H and contact body 16, radially outwards up to the end of the non-press-fitted radial spring arrangement 22, i.e. V/L≤0.75 would be preferable, wherein the rolling movement and therefore the oscillation in the direction of the central axis O should be equal to or less than V.

In an experimentally used bearing 10 in accordance with one or more of the embodiments, and on the basis of the variables or variable ratios shown below with respect to the dimensions, material properties and the like of the bearing 10 in accordance with the invention, the following variable ratios were used in order to likewise achieve outstanding results with respect to the properties and durability of the bearing 10 in accordance with the invention: H/L≈1.0; H/K≈0.6; and V/L≈0.25.

These ratios were achieved using the following values of an embodiment used: K=7.3; H=4.3; V=1.0; L=4.2; S=4.0.

In relation to the ratios specified, it should be noted that H/L can also be less than 1.0, wherein the range should be H/L≤5. It should also be possible for the range for H/K to be less than 0.6, but approximately H/K<1, and the range for V/L should be ≤0.75.

It should be noted that the flange 50 can consist of steel, stainless steel, die-cast aluminum or solid plastic materials. Implementations are variable in this respect, wherein it is preferable for the inner wall of the tube or flange 50 to provide a sufficient coefficient of friction, such that the rolling movement of the radial spring arrangement 22 can be performed such that the contact surface 20 remains stationary.

Figures 2, 3A, 3B, 4, 5A, 5B:
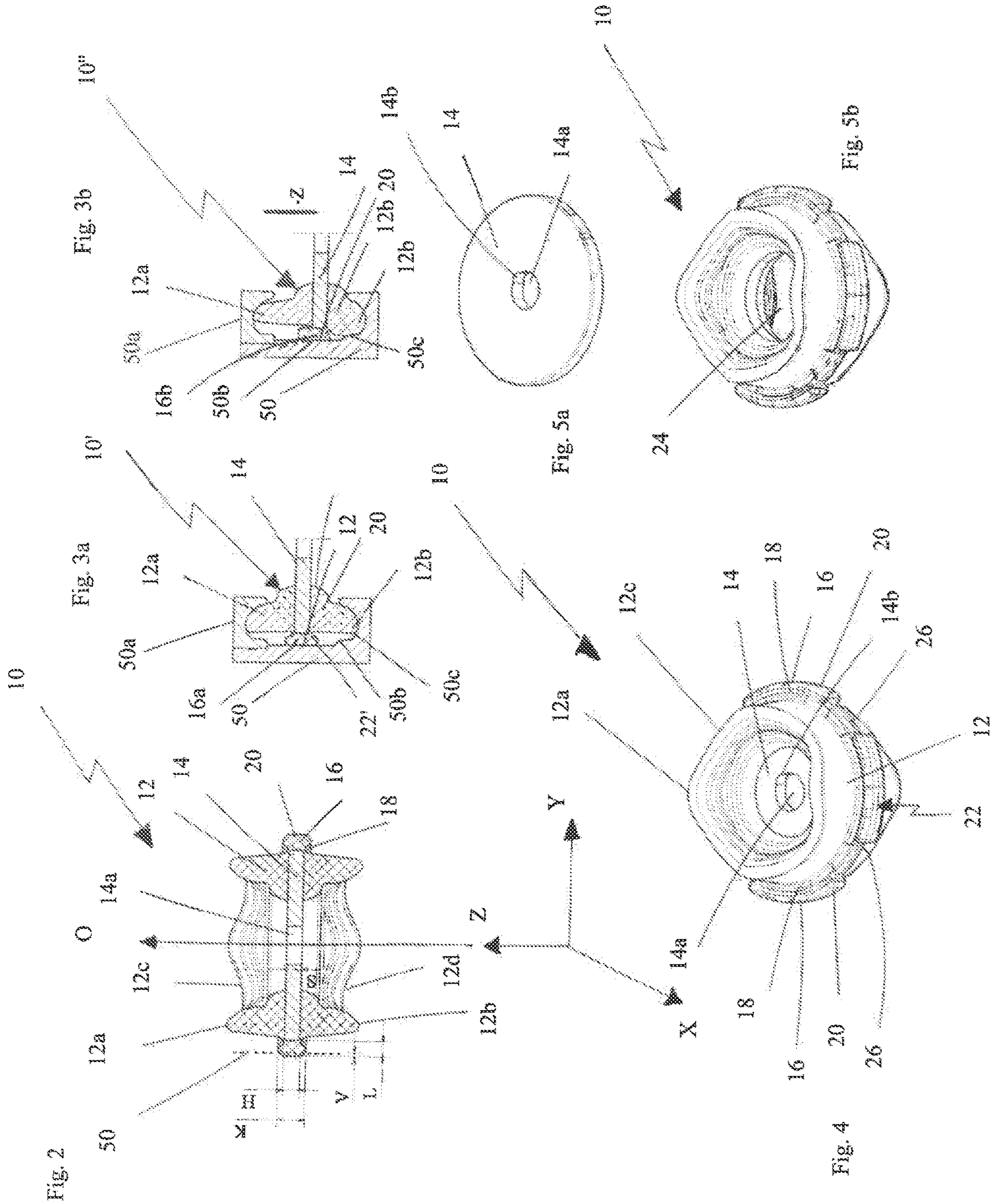
FIG. 2 is a reduced relative view in accordance with FIG. 1, for referring to FIGS. 3*a* and 3*b;*
FIGS. 3*a* and 3*b* are partially sectional views of the assembled bearing, before and after the bearing is subjected to a load.
FIG. 4 a perspective view of a bearing obliquely from above.
FIGS. 5*a* and 5*b* are an exploded perspective view of the bearing wherein the disk is shown separately.

FIG. 2 shows a reduced version of the embodiment in accordance with FIG. 1 in order to establish the relationship between the bearing 10 and its press-fitted and deformed versions 10' and 10".

It should be noted generally that identical constituent parts are indicated by the same reference signs with respect to all of the figures shown here, such that repeated descriptions of identical constituent parts are omitted.

In relation to FIG. **3*a*, it can be seen that the press-fitted bearing 10' is press-fitted and therefore deformed in relation to its wave crests 12*a*, 12*b* and in relation to its contact body 16*a*** and is therefore biased.

The flange 50 comprises an inner surface **50*b* which corresponds to the dashed line 50 in accordance with FIG. 2, such that it is easily conceivable that the contact body 16*a* is press-fitted, while it is not yet press-fitted as depicted in FIG. 2. The wave crests 12*a*, 12*b* are incorporated in a press-fitting way into corresponding receiving geometries 50*c* of the flange 50**.

FIG. **3*b* shows the press-fitted and deformed bearing 10". An axial oscillation or deformation in the direction of the central axis O of the bearing 10" is shown and denoted by −Z, which is intended to represent the travel of the bearing 10" in accordance with the invention. As is shown, the contact surface 20 of the press-fitted contact body 16*a* has not altered its position relative to the inner surface 50*b* of the flange 50, wherein a rolling deformation of the radial spring arrangement 22 can be assumed. Once the oscillation Z in the direction of the central axis O of the bearing 10" has lapsed, the bearing will return to its position 10' in accordance with FIG. 3*a*, in which it is press-fitted but not subjected to a load, wherein the contact surface 20 still has the same position with respect to the flange 50** in the direction of the central axis O.

The rolling, reversible deformation reduces disruptive noise which could otherwise occur when the bearing in accordance with the invention is actuated in a way in which it is subjected to and relieved of a load.

Relative movements which occur between the base body 12 and the flange 50 can be optimized, which is enabled by the rolling, reversible function of the radial spring arrangement 22.

Figure 6:
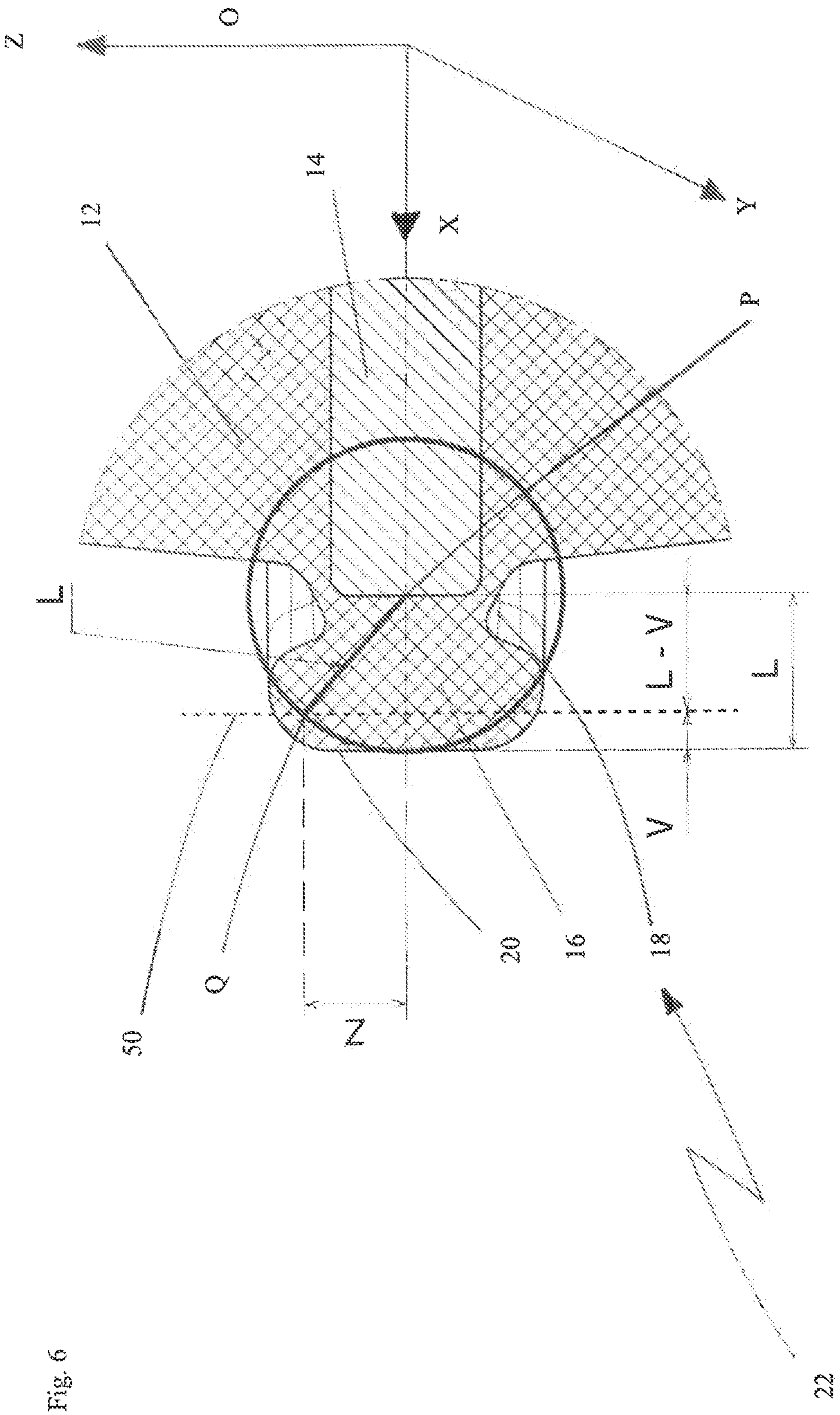
FIG. 6 is a sectional view of an embodiment of a radial spring arrangement for referring to a formula for approximately calculating a broadly maximum rolling oscillation.

Referring to FIG. 6, an at least broadly realistic value can be ascertained for the oscillation Z in the direction of the central axis O of the base body 12 which can be overcome by means of a rolling movement of the radial spring arrangement 22 according to the invention. The formula which is useful for this purpose is $Z \sim \sqrt{L^2-(L-V)^2}$ and is based on the known Pythagorean theorem.

Since the disk 14 can be assumed to be relatively rigid, the rolling compensatory movement ±Z can be performed substantially as of an end point P of the disk 14, wherein the variable L−V then represents the extent of the radial spring arrangement 22 when the bearing 10, 10', 10" in accordance with the present invention is press-fitted into a flange 50 (see FIG. 3*a*), broadly at the press-fit application point Q at which the press-fit results in the inner wall of the flange 50 intersecting with the variable L-V, starting from the variable L of the radial spring arrangement 22 when the bearing is not press-fitted (see FIGS. 1 and 2).

Variables which are relevant in relation to the present invention are summarized again below.

$F_R=\mu*F_N$, wherein $F_R$ is generated between the rubber bearing (radial spring) and the flange 50 (in the region of the contact surface K)

$F_R$ is the friction force (high as possible)

μ is the coefficient of friction (high as possible: friction increased by material pairing/surface quality)

$F_N$ is the normal force (high as possible: the bias V is as high as possible and also indirectly influenced by the Shore A hardness, even after the Z movement)

K is the contact surface (large as possible to ensure stable operation within the scope of necessity)

H is the neck (flexible and soft as possible)

V is the bias (high as possible in order to increase $F_N$, within the scope of physical possibility, e.g., able to be installed, degree of radial rigidity, etc.)

L is the radial spring length (large as possible in order to be flexible and soft, within the limits of stability)

S is the disk thickness (dependent on the design chosen, which is variable)

$K>H$ $L>H$ $V<L$ ($V>0$)

$H>S$ (not very much greater than S)

Possible Ratios:

approximate range of $H/L \leq 5$ approximate range of $H/K<1$ approximate range of $V/L \leq 0.75$ FIG. 4 is a perspective view of a bearing 10. The position of the disk 14 and its assembly opening 14*a* is clearly shown in this perspective plan view. The assembly opening 14*a* comprises a groove 14*b* which can serve to fix the position of a device to be mounted, for example a spring strut head. The successive wave crests and troughs 12*a*, 12*c*, etc. (see FIGS. 1 and 2) are shown schematically.

Stayless circumferential sectors 26 are configured between the successive contact bodies 16, which are respectively provided over only some of the circumference. The contact bodies 16 are connected to the base body 12 of the bearing 10 via stays 18. The stays 18 comprise constrictions, such that it is possible for the contact body 16 to be more flexibly attached to the base body 12. The contact body 16 shown here, together with its adjoining stay 18, is therefore mushroom-shaped in its cross-section H, but can also be hammer-shaped. The contact surfaces 26 provided on the outer circumference of the contact bodies 16 are press-fitted into a flange 50 when installed and deformed in a rolling way when subjected to a load, which corresponds to the implementations of the radial spring arrangement 22.

FIG. 5*a* shows a disk 14 such as is accommodated in the bearing 10 in accordance with FIG. 4. The disk 14 is assembled in a functionally ready arrangement in the bearing 10. In the bearing 10 in accordance with FIG. 5*b*, the disk 14 is shown to not be contained in the disk receptacle 24, but is press-fitted into this region of the disk receptacle 24 for the purpose of completing the bearing 10 in accordance with the invention, though it can also be glued or vulcanized into the disk receptacle 24.

Although not shown, it will be clear that the contact surface 20 can be embodied in any way on the outer circumference of the contact body 16, for example in order to provide greater friction. Accordingly, the contact surface 20 can also be undulating, burled or structured in some other way. It is also possible to spray other materials onto the contact surfaces 20 in order to provide a greater coefficient of friction.

The inner surface of the flange 50 can correspondingly also be provided with a structure in order to establish a greater friction force or can be embodied to comprise a groove, which the contact surface 20 engages, in order to achieve a force fit.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE SIGNS

10 bearing
10' press-fitted bearing
10" deformed bearing
12 base body
12*a*, 12*b* wave crest
12*c*, 12*d* wave trough
14 disk
14*a* assembly opening
14*b* groove
16 contact body
16*a* press-fitted contact body
16*b* deformed contact body

18 stay
20 contact surface
22 radial spring arrangement
24 disk receptacle
26 stayless circumferential sector
50 installation environment, tube, flange, housing
**50*a*** flange cover
**50*b*** inner surface of the flange
**50*c*** receiving geometry
O central axis
P end point
Q press-fit application point
Z axial deformation

The invention claimed is:

1. A bearing for a device to be mounted, comprising:

a base body which extends along and around a central axis (O);

a disk, for attaching the bearing to the device to be mounted, wherein said disk extends around and substantially perpendicular to the central axis (O);

a radial spring arrangement provided on the outer circumference of the base body, the radial spring arrangement comprising a stay which extends outwards from the base body at an angle up to perpendicular to the central axis (O), wherein on the side of the stay facing away from the base body, the radial spring arrangement comprises a contact body which has an outwardly facing and free contact surface, wherein the base body, the stay and the contact body are an integral component, and wherein the contact body is not continuous about the outer circumference of the base body and is configured to be pressed during installation and to be held in an installation environment assigned to the bearing in a rolling deformable manner; and wherein the contact body is press-fitted into the installation environment so that the outwardly facing and free contact surface is held in contact to the installation environment by friction force in a stationary manner.

2. The bearing according to claim 1, wherein the radial spring arrangement is provided over some or all of the circumference of the base body.

3. The bearing according to claim 1, wherein the radial spring arrangement is provided at uniform intervals on the outer circumference of the base body.

4. The bearing according to claim 1, wherein that the contact body is larger than the stay in the direction of the central axis (O), wherein the stay is cross-sectionally constricted in some regions.

5. The bearing according to claim 1, wherein the disk is provided centrally in the base body.

6. The bearing according to claim 1, wherein the stay and/or the contact body extend(s) outwards as a continuation of the disk, starting from the base body.

7. The bearing according to claim 1, wherein the installation environment comprises an outer tube or flange is provided which surrounds the bearing and which the contact surface of the contact body abuts.

8. The bearing according to claim 1 wherein the bearing comprises a support bearing or a spring strut head bearing.

* * * * *